US005852252A

United States Patent [19]

Takano

[11] Patent Number: 5,852,252

[45] Date of Patent: Dec. 22, 1998

[54] CHORD PROGRESSION INPUT/ MODIFICATION DEVICE

[75] Inventor: Junichi Takano, Hamamatsu, Japan

[73] Assignee: Kawai Musical Instruments Manufacturing Co., Ltd., Hamamatsu, Japan

[21] Appl. No.: 877,778

[22] Filed: Jun. 18, 1997

[30] Foreign Application Priority Data

Jun. 20, 1996 [JP] Japan .................................... 8-179980
Jun. 24, 1996 [JP] Japan .................................... 8-181646

[51] Int. Cl.[6] .............................. G09B 15/02; G10H 1/38

[52] U.S. Cl. ............................ 84/650; 84/669; 84/477 R; 84/DIG. 22

[58] Field of Search ..................... 84/613, 637, 650–652, 84/669, DIG. 22, 470 R, 477 R, 478

[56] References Cited

U.S. PATENT DOCUMENTS 5,153,361 10/1992 Kozuki ...................................... 84/613
5,218,157 6/1993 Akagawa et al. ......................... 84/637
5,418,326 5/1995 Ikeda et al. .............................. 84/637
5,561,256 10/1996 Aoki et al. ............................ 84/637 X
5,602,357 2/1997 Aoki et al. ............................ 84/637 X
5,650,584 7/1997 Shinsky ................................. 84/613 X
5,670,731 9/1997 Imaizumi ................................. 84/613

*Primary Examiner*—Stanley J. Witkowski
*Attorney, Agent, or Firm*—Christie, Parker & Hale, LLP

[57] ABSTRACT

In a chord progression input/modification device, when a key and a single or two successive reference chords are designated by a user, available chords are acquired and displayed. Any one of the available chords can be used, in consonance with musical theory, to follow or substitute for the single reference chord, or to be inserted between the two reference chords for generating a modified chord progression. The chord progression modification device may be installed in an electronic musical instrument.

19 Claims, 7 Drawing Sheets

| KEY/ CHORD ROOT | C | $D^b$ | D | $E^b$ | E | F | $G^b$ | G | $A^b$ | A | $B^b$ | B |
|---|---|---|---|---|---|---|---|---|---|---|---|---|
| DISTANCE | 0 | 1 | 2 | 3 | 4 | 5 | 6 | 7 | 8 | 9 | 10 | 11 |

| DISTANCE SYMBOL | I | $^b$II | II | $^b$III | III | IV | $^b$V | V | $^b$VI | VI | $^b$VII | VII |
|---|---|---|---|---|---|---|---|---|---|---|---|---|
| DISTANCE | 0 | 1 | 2 | 3 | 4 | 5 | 6 | 7 | 8 | 9 | 10 | 11 |

FIG. 4

TABLE A

| DISTANCE SYMBOL | | I | bII | II | bIII | III | IV | bV | V | bVI | VI | bVII | VII |
|---|---|---|---|---|---|---|---|---|---|---|---|---|---|
| BASIC CHORD TYPE | MAJOR | △7 | △7 | 7 | △7 | 7 | △7 | 7 | 7 | △7 | △7 | △7 | 7 |
| | MINOR | | | m7 | | m7 | m6 | | m7 | | m7 | | m7 |

FIG. 5

TABLE B

| BASIC CHORD TYPE | TENSION CHORD |
|---|---|
| △7 | add9, b5, 6, $6^{(9)}$, $△7^{(\ )}$ |
| m7 | $m^{(\#5)}$, $m7^{(\ )}$, $m9^{(\ )}$ |
| 7 | aug, 7sus4, 11, 13, $7^{(\ )}$, $9^{(\ )}$ |
| m6 | madd9, m△7, m△9, $m6^{(9)}$ |
| $m7^{(b5)}$ | $m7^{(b5□)}$ |
| dim | $dim^{(\ )}$ |

FIG. 6

TABLE C

| FUNCTION CHORD | TENSION CHORD |
|---|---|
| I△7 | △9, $6^{(9)}$ |
| IV△7 | △9, $6^{(9)}$, $△7^{(\#11)}$ |
| IIm7<br>VIm7 | m9, $m9^{(11)}$ |
| IIIm7 | $m7^{(b13)}$, $m7^{(11)}$ |
| ⋮ | ⋮ |

| FUNCTION CHORD | TENSION CHORD |
|---|---|
| III7 | $7^{(b9)}$, $7^{(\#9)}$, $7^{(b9,\ b13)}$<br>$7^{(\#9,\ b13)}$ |
| V7 | 9, 11, 13, $9^{(13)}$, $9^{(11,13)}$<br>$7^{(b9)}$, $7^{(\#9)}$, $7^{(b9,\ b13)}$<br>$7^{(\#9,\ b13)}$ |
| VI7 | 9, 11, $7^{(b9)}$, $7^{(\#9)}$<br>$7^{(b9,\ b13)}$, $7^{(\#9,\ b13)}$ |
| ⋮ | ⋮ |

FIG. 7

| REFERENCE FUNCTION CHORD | SUITABLE FOLLOWING FUNCTION CHORD | |
|---|---|---|
| | MAJOR KEY | MINOR KEY |
| Ⅱm7 | Ⅴ7<br>Ⅵm7<br>Ⅲm7<br>Ⅲ7<br>ⅠΔ7<br>⋮ | Ⅲ7<br>Ⅶm7$^{(b5)}$<br>Ⅴ7<br>Ⅵm7<br>Ⅱ7<br>⋮ |
| Ⅴ7 | ⅠΔ7<br>⋮ | Ⅲ7<br>⋮ |
| ⋮ | ⋮ | ⋮ |

FIG. 8

| REFERENCE CHORD | SUITABLE FOLLWING CHORD | |
|---|---|---|
| | STRAIGHT | COMPLEX |
| Am7 | D, D7,<br>Em, Em7<br>Bm, Bm7<br>B, B7<br>G, GΔ7<br>⋮ | D9, D13, D9$^{(13)}$, D7$^{(b9)}$, D7$^{(\#9)}$, etc.<br>Em9, Em9$^{(11)}$<br>Bm7$^{(b13)}$, Bm7$^{(11)}$<br>B7$^{(b9)}$, B7$^{(\#9)}$, B7$^{(b9, b13)}$, B7$^{(\#9, b13)}$<br>GΔ9, G6$^{(9)}$<br>⋮ |

FIG. 9

| REFERENCE FUNCTION CHORD | PRECEDING FUNCTION CHORD |
|---|---|
| ⅠΔ7 | bⅡΔ7<br>bⅡ7<br>Ⅱm7<br>ⅣΔ7<br>Ⅴ7<br>bⅥΔ7<br>Ⅵm7<br>bⅦΔ7<br>bⅦ7<br>⋮ |
| ⋮ | ⋮ |

FIG. 10

| TWO SUCCESSIVE REFERENCE CHORDS | CHORDS TO BE INSERTED | |
|---|---|---|
| | STRAIGHT | COMPLEX |
| Am7 & GΔ7 | D, D7, | D9, D13, $D9^{(13)}$, $D9^{(11, 13)}$, $D7^{(b9)}$ |
| | Em, Em7 | Em9, $Em9^{(11)}$ |
| | $A^{b}7$ | $A^{b}9$, $A^{b}13$, $A^{b}9^{(\#11)}$, $A^{b}7^{(\#9)}$ etc. |
| | $A^{b}$, $A^{b}Δ7$ | $A^{b}Δ9$, $A^{b}Δ7^{(\#11)}$ |
| | C, CΔ7 | CΔ9, $C6^{(9)}$, $CΔ7^{(\#11)}$ |
| | F7 | F9, F13, $F9^{(\#11)}$, $F9^{(13)}$, $F9^{(11, 13)}$ |
| | F, FΔ7 | FΔ9, $F6^{(9)}$ |

FIG. 13

| REFERENCE CHORD | SUITABLE FOLLOWING CHORD | | |
|---|---|---|---|
| | PROBABILITY | STRAIGHT | COMPLEX |
| Am7 | 25% | D, D7, | D9, D13, $D9^{(13)}$, $D7^{(b9)}$, $D7^{(\#9)}$, etc. |
| | 20 | Em, Em7 | Em9, $Em9^{(11)}$ |
| | 17 | Bm, Bm7 | $m7^{(b13)}$, $Bm7^{(11)}$ |
| | 13 | B, B7 | $B7^{(b9)}$, $B7^{(\#9)}$, $B7^{(b9, b13)}$, $B7^{(\#9, b13)}$ |
| | 10 | G, GΔ7 | GΔ9, $G6^{(9)}$ |
| | ⋮ | ⋮ | ⋮ |

CHORD PROGRESSION INPUT/ MODIFICATION DEVICE

BACKGROUND OF THE INVENTION

1. Field of the Invention

The present invention relates to a chord progression input/modification device and in particular, the present invention relates to a chord progression input/modification device that searches for a chord which can be located next to a designated reference chord or between designated successive two chords in a chord progression, can be substituted for an existing chord, or can be newly inputted and that displays the chord that is thus searched for, or inputted.

2. Description of the Related Art

Conventionally, certain types of electronic musical instruments, such as electronic pianos and synthesizers, are equipped with automatic accompaniment devices for generating accompaniment musical tone signals in consonance with a chord progression that is either previously written into ROMs, or given by users. With these instruments, users can arbitrarily read out the chord progression stored in the automatic accompaniment devices, and can modify the chord progression by rewriting, replacing, adding or inserting a chord or chords.

However, as there are more than 500 different chords, and even when a beginner who is not fully conversant with the theory of chords endeavors to alter chords, the beginner does not know which chord would in consonance with musical theory be correct at a particular location for modification. It is, therefore, difficult for the beginner to select the proper chord when modifying (inputting, rewriting or inserting) a chord progression.

Generally, a chord consists of four notes, that is, the root, the third, the fifth and the seventh, with a chord that excludes the seventh from the above four notes being called a triad, and a chord to which is added the ninth, the eleventh or/and the thirteenth notes above the seventh being called a tension chord. The tension chord that was originally derived from jazz, is popularly used for the latest pops, resulting in very rich chord acoustics.

Conventionally, an automatic accompaniment device can employ various types of chord, including tension chords. However, the beginner cannot determine on which occasion, and how tension chords should be combined and used, and thus cannot satisfactorily employ the function provided in the automatic accompaniment device.

SUMMARY OF THE INVENTION

It is an object of the present invention to provide a chord progression input/modification device in which merely the designation of a key and a chord name, or a chord progression as reference, is required for the selection, in consonance with musical theory, and display of an employable chord group to follow the designated reference chord, or to be inserted between two successive chords in the designated chord progression.

It is another object of the present invention to provide a chord progression input/modification device in which merely the designation of a key and a chord as reference is required for the selection, in consonance with musical theory, and display of a chord group that can be replaced with the designated reference chord.

As a first feature of the present invention, a chord progression input/modification device comprises: means for obtaining a reference function chord corresponding to a reference chord designated by a user, acquisition means for acquiring a group of suitable following function chords which can follow the reference function chord in consonance with musical theory, and means for obtaining at least one of the triads, basic chords and tension chords corresponding to each function chord in the group of suitable following function chords as a group of suitable following chords.

As a second feature of the present invention, a chord progression modification device comprises: means for obtaining first and second reference function chords respectively corresponding to first and second successive reference chords designated by a user, a first acquisition means for acquiring a group of suitable following function chords which can follow the reference function chord in consonance with musical theory, a second acquisition means for acquiring a group of suitable preceding function chords which can precede the reference function chord in consonance with musical theory, a third acquisition means for acquiring a group of suitable function chords to be inserted, which are commonly included in both of the groups of suitable following and preceding function chords, and means for obtaining at least one of the triads, basic chords and tension chords corresponding to each function chord in the group of suitable function chords to be inserted as a group of suitable chords to be inserted.

As the third feature of the present invention, a chord progression modification device comprises: means for obtaining a reference function chord corresponding to a reference chord designated by a user, acquisition means for acquiring a group of suitable substitute function chords which can be used in place of the reference function chord in consonance with musical theory, and means for obtaining at least one of the triads, basic chords and tension chords corresponding to each function chord in the group of suitable substitute function chords as a group of suitable substitute chords.

BRIEF DESCRIPTION OF THE DRAWINGS

FIG. 4 is a diagram of a table to be referred to for converting a triad chord to a basic chord;

FIG. 5 is a diagram for explaining a table for classifying chords corresponding to basic chord types;

FIG. 6 is a diagram explaining a table in which are stored suitable tension chord types for individual function chords;

FIG. 7 is a diagram illustrating an example of a suitable following chord table;

FIG. 8 is a diagram illustrating an example of a suitable following chord display;

FIG. 9 is a diagram showing an example of a suitable preceding chord table;

FIG. 10 is a diagram showing an example of a suitable insertion chord display;

FIG. 13 is a diagram illustrating an example of a display for transition probabilities for individual suitable following chords.

DETAILED DESCRIPTION OF THE PREFERRED EMBODIMENTS

Figures 1, 2, 3:
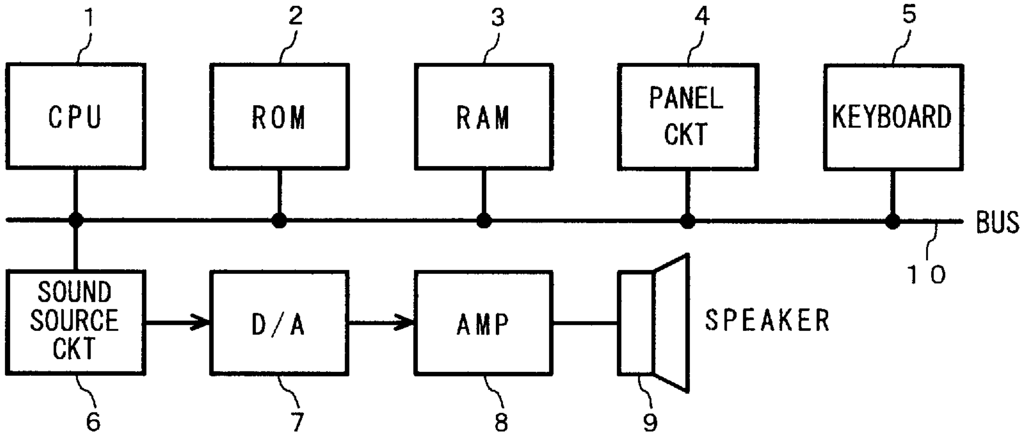
FIG. 1 is a block diagram illustrating the arrangement of an electronic piano according to the present invention.
FIG. 2 is an explanatory diagram for a table showing the relationship between keys or chord roots and values.
FIG. 3 is a diagram for explaining a table showing the relationship between distance symbols and distance values for a function chord.

The preferred embodiments of the present invention will now be described in detail while referring to the accompanying drawings. FIG. 1 is a block diagram illustrating the arrangement of an electronic piano according to the present invention. A CPU 1 controls the entire electronic piano by using a control program stored in a ROM 2, in which are stored a control program, timbre parameters, chord progression data and other data. The timbre parameters are, for example, address information and envelope control information for tone waveforms that are stored in a waveform memory. A RAM 3, which is employed as a work area and a buffer, may be backed up by a battery, with chord progression that is written by a user being stored in the RAM 3. A panel circuit 4 includes various switches for selecting timbre and other musical qualities, the display of characters with liquid crystal and/or LED and their interface circuits. A keyboard 5 is a keyboard including a plurality of keys each having two switches, and a circuit for scanning the switch states of the individual keys to detect changes in the switch states and for generating key event data and touch data.

A sound source circuit 6 generates a desired musical tone signal according to a tone waveform reading system, for example. Specifically, waveform data are sequentially read, at an address interval that is proportional to a pitch to be generated, out of a waveform memory in which digital tone waveform sampling values are stored, and are interpolated to generate a tone waveform signal. The sound source circuit 6 includes an envelope generator which generates an envelope signal based on a set of envelope parameters. The sound source circuit 6 further multiplies a tone waveform signal by the envelope signal to generate a musical tone signal. Although the sound source circuit 6 has a plurality (e.g., 32) of musical tone generation channels, in actuality a plurality of musical tone signals can be independently and simultaneously generated by employing time sharing for the multiplexing of a single tone generator.

A D/A converter 7 converts a digital musical tone signal into an analog signal, an analog signal is amplified by an amplifier 8 and the resultant signal is released through a loudspeaker 9, and a bus 10 connects the individual circuits in the electronic piano to each other. A memory card interface circuit, a floppy disk drive, and a MIDI interface circuit may be included as needed.

FIG. 2 is an example of a table showing keys or chord roots and their corresponding numeral values. In this example, while employing C as a reference, the numeral values are stored in a semitone unit that represent the pitches for twelve musical tones, extending from C(Do) to B(Si) in one octave. These values are defined as “distances” in the present specification. Since the usual chord progression is stored or represented with C major as the key, C is defined as “0 distance” in the embodiment; however, the name of the pitch that corresponds to “0” can be determined arbitrarily.

FIG. 3 is a correspondence table of the numeral values that respectively represent the distances in a semitone unit and the distance symbols (Roman numerals) wherein the chord progression is expressed by function chords. Generally, the chord is written in a combination of a root (C through B) and a chord type (m, 7, etc.). The function chord is a combination of a root name which is represented with the above distance symbol that indicates a distance extending between a tonic or key note and a chord root, and a basic chord type which is a chord type expressed in a straight form. In FIG. 3, for example, the numeral value “0” corresponds to the distance symbol “I” which defines the distance from the tonic to the chord root as “0”, i.e., shows that the chord root and the tonic are the same tone. Similarly, value “7” corresponds to distance symbol “V” which defines the distance from the tonic to the chord root as “7”.

Figure 11:
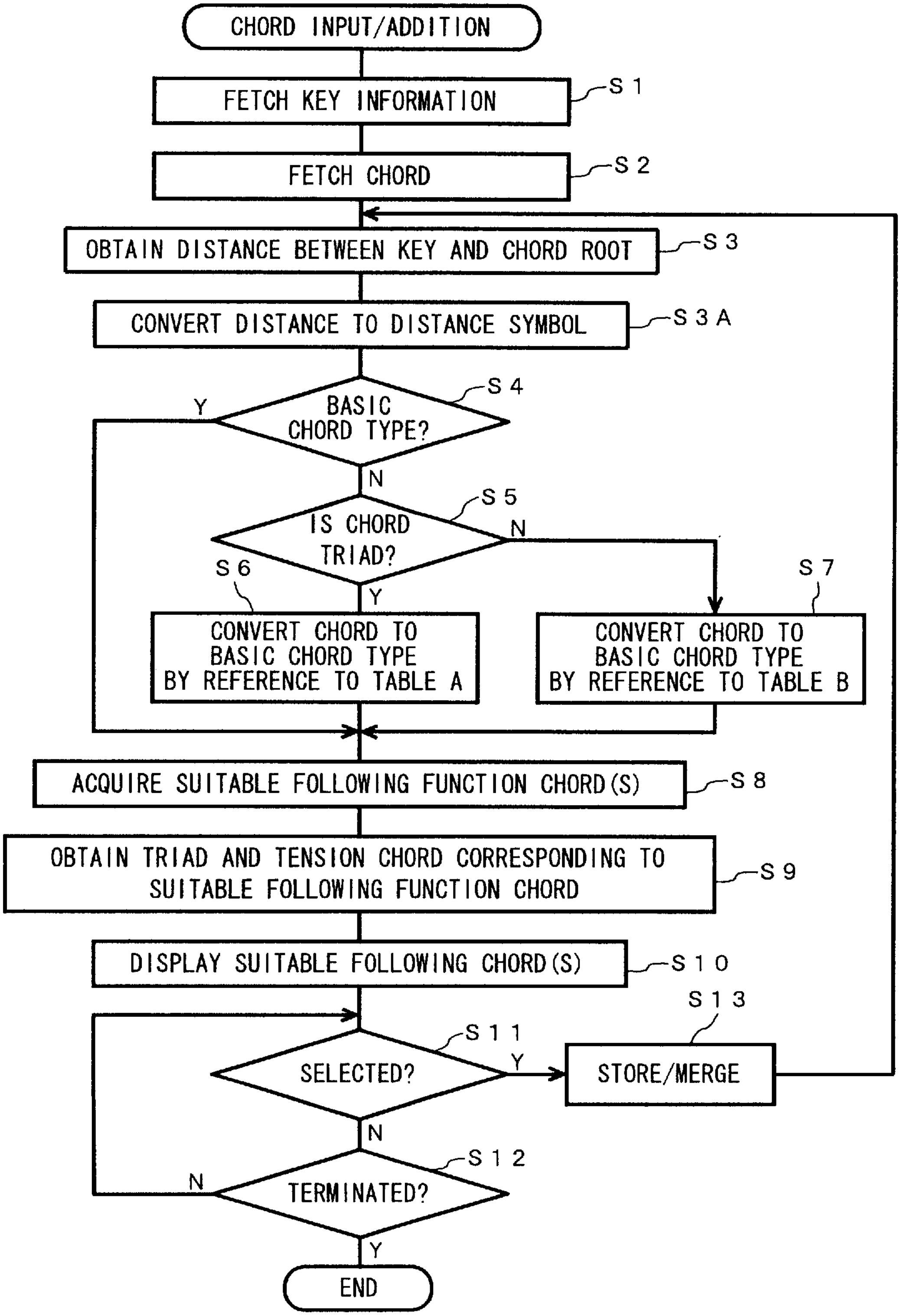
FIG. 11 is a flowchart for chord progression addition processing according to a first embodiment of the present invention.

FIG. 11 is a flowchart showing chord progression input/addition processing according to a first embodiment of the present invention. This process is begun when an instruction is inputted by a user from a panel for modification (input, or addition) of chord progression.

At step S1, information is fetched concerning designated key (C through B, and major/minor identification) inputted by the user. Since, for the addition of a chord to an existing chord progression, the user selects one of the chord progressions prepared and stored in advance, the key which is included in the chord progression selected is fetched at step S1.

At step S2, the chord inputted by the user is fetched. For newly input chord progression, the user is allowed to input any chord as a reference. In the addition of a chord to a prepared and existing chord progression, the last chord in the chord progression is read out as a reference chord. At step S3, the key and chord root of the reference chord are respectively converted to numerical values by referring to the table shown in FIG. 2, and the distance between the key and the chord root is obtained by finding the difference between their values. For example, when a key is C major and a chord root is G, the difference between them is 7−0=7 as the value of the key is “0” and the value of the chord root is “7”. When, for another example, a key is “A” and a chord root is “E”, a difference between them is 4−9=−5. When the difference is negative as in this example, 12 (constant) is added to the difference to obtain “7”.

At step S3A, the distance acquired at step S3 is changed to a distance symbol by referring to the table in FIG. 3. By referring to the table in FIG. 3, distance “7” is changed to distance symbol “V”. That is, the distance symbol corresponding to chord root “G” is “V” when the key is “C”.

At step S4, a check is performed to determine whether or not the reference chord that is fetched or read at step S2 is one of the basic chord types. There are six kinds of basic chord types: Δ7 (major sevenths),m7 (minor seventh), 7, m7$^{(B5)}$, m6 and dim. When the chord fetched is not of a basic chord type, program control moves to step S5, whereat a check is performed to determine whether or not the chord is a triad. When the chord is a triad, program control advances to step S6. But if the chord is not a triad, program control moves to step S7.

At step S6, the triad chord is converted to a basic chord type by referring to the table A in FIG. 4. In Table A the relationships between distance symbols (I through VII) acquired at step S3 and the basic chord types are shown separately for major chords and minor chords. When, for example, a triad in question is a major and a distance symbol is “V”, the basic chord type “7” that corresponds to distance symbol “V” is searched for in the Table A, so that the function chord is obtained as “V7”. It should be noted that blank columns in Table A correspond to chords that are not normally used.

At step S7, a tension chord or an other type of chord is converted to a basic chord type by referring to Table B in FIG. 5. In Table B, the tension chords to be entered or referred are classified into the basic chord types. It is apparent from table B, for example, that chord type "11" (eleventh) belongs to the basic chord type "7". In the chord types in the Table B, chords with empty parentheses or parentheses in which a □ mark is entered represent those that have arbitrary symbols to be filled therein.

When the processes at steps S6 or S7 has been executed, program control advances to step S8. If the reference chord is of a basic chord type, program control skips steps S5, S6 and S7, which are processes for converting the reference chord to the basic chord types, and moves to step S8. At step S8, a table shown in FIG. 7 is employed to acquire suitable following function chords. In this table, the suitable following chords that correspond to the selected reference chord (existing chord) are registered separately in a form of function chords for major keys and minor keys. The suitable following function chords can be generated by acquiring the statistics from a great number of chord progression that are randomly extracted to obtain the probability (the use frequency) of function chords following a specific function chord, and by arranging the function chords thus obtained in the descending order of the probability. In FIG. 7, when the reference or preceding function chord is "IIm7", it will be most probably followed by the function chord "V7" for the major key. From the function chords, corresponding suitable basic chords are easily obtained.

At step S9, tables A and C shown in FIGS. 4 and 6 are referred to acquire triad and tension chords for the suitable following function chord(s) obtained at step S8. The triad may be acquired, in general, by deleting of all symbols other than a distance symbol and a minor symbol (m) from the function chord. The triad of a basic chord type such as Δ7, 7, m7, m6 shown in FIG. 4 may be acquired by an inverted referring to the table A based on the function chord. In table C shown in FIG. 6, tension types that can be used instead of function chords are stored for individual function chords, and suitable following tension chords are acquired by examining table C.

At step S10, the suitable basic chords obtained at step S8, and the triad and the tension chord which have been obtained at step S9 are displayed as the next suitable chords. FIG. 8 are shows an example of displays of the next suitable chords. In this example, the suitable following chords for the reference chord (Am7) are displayed separately for the triad and the basic chords (these two will be called "straight" chords), and for the tension chords (which are called "complex" chords).

For the display, since the chords originally obtained at step S9 are function chords, their distance symbols must be converted into chord root symbols for display in step S10. This process is the reverse of that at step S3, that is, the distance symbol in the function chord is converted into a numeral value, and a pitch name to which a key is transposed by the equivalent of the numeral value is determined as a chord root.

When, for example, a key is "G" and a function chord has the distance symbol "V", the distance symbol "V" is converted into the numeral value "7" by using the table in FIG. 3, and the value "7" thus obtained is added to the value "7" for key "G". Since the sum "14" is greater than "12", the constant "12" is subtracted from the sum to obtain "2". A chord root corresponding to value "2" is searched for in the table shown in FIG. 2 and chord root "D" is acquired.

At step S11, a check is performed to determine whether or not the user has selected any one of the next suitable chords that are displayed as shown in FIG. 8. When the result is affirmative, program control moves to step S13. When the result is negative, program control moves to step S12. At step S12 a check is performed to determine whether or not the termination of the chord progression modification (adding or inputting) processing has been instructed. When the result is negative, program control returns to step S11. When the result is affirmative, the processing is terminated. At step S13 the selected chord is merged to be added to the chord progression, and program control returns to step S3 to repeat the process to precede the above-mentioned modification process for the newly merged chord. Through the above-described processing, the succeeding chord or chords are easily selected and merged in consonance with musical theory.

A second example of chord progression input/addition will now be described. When, for example, a key is "G" and the reference chord is "Am", at steps S3 and 3A the distance between key "G" and "A" which is the chord root of chord "Am", and a distance symbol are acquired. In other words, numeral values for key "G" and chord root "A" of "7" and "9" are obtained by examining the table in FIG. 2. The difference between them, 9−7=2, is then converted to the distance symbol "II" by using the table in FIG. 3. Since chord "Am" is a triad (minor), then the distance symbol "II" column in table A in FIG. 4 is referred to and the triad "Am" is converted into minor basic chord type "m7". As a result, the function chord for "Am" is determined to be "IIm7".

Sequentially, the suitable next function chord for "IIm7" is acquired by examining the table in FIG. 7. Since key "G" is a major, function chords "V7", "VIm7", "IIIm7", . . . are obtained in the descending order of probability. Triads such as "V", "VIm", "IIIm", . . . are acquired by deletion of all symbols other than distance symbols and minor symbols (m) from the obtained function chords, as previously described. While the tension chords are acquired corresponding to their function chords by examining table C in FIG. 6. The basic, triad and tension chords are displayed separately for "straight" chords and "complex" chords, as is shown in FIG. 8. For display, distance symbols in the function chords are converted to chord roots, as previously described.

Figure 12:
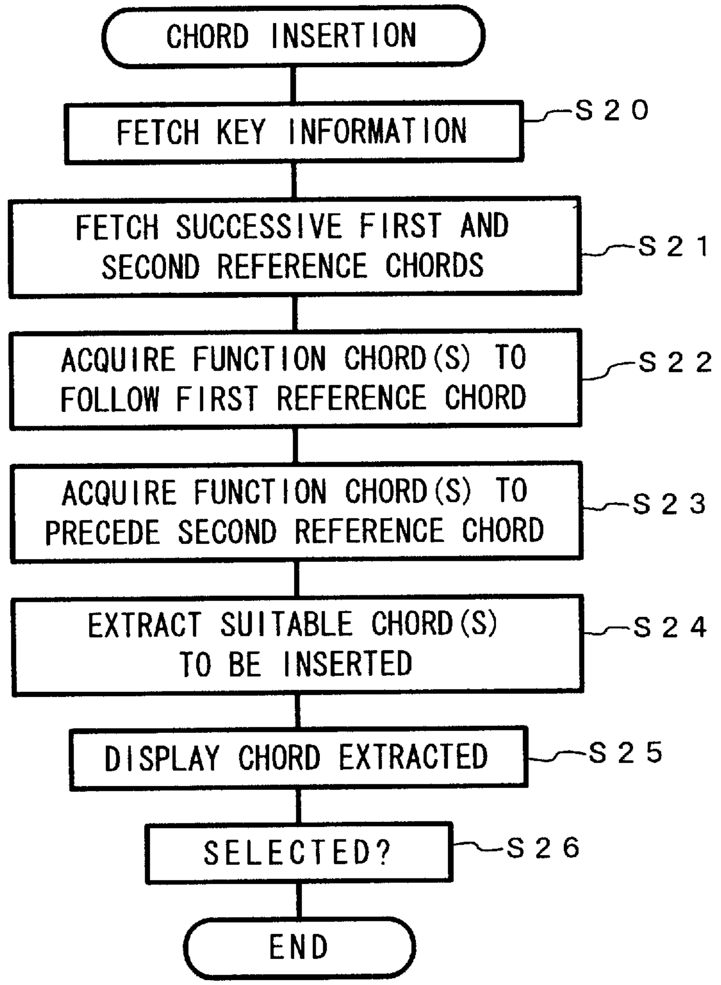
FIG. 12 is a flowchart for chord insertion processing according to a second embodiment of the present invention.

FIG. 12 is a flowchart for chord insertion processing according to a second embodiment of the present invention. In the first embodiment, suitable chords that may follow a reference chord are acquired and displayed to be selected. In the second embodiment, however, suitable chords that may be inserted between two successive reference chords are acquired and displayed to be selected, while the processing in the first embodiment is employed as a base.

At step S20 in FIG. 12, designated key information is fetched. At step S21, a user is instructed either to enter a pair of preceding and succeeding chords as reference chords, or to select one of the chord progressions that has been stored and designate a location in the chord progression into which a new chord is to be inserted. The input chords or the designated chord progression is accordingly fetched. The display of the instruction and notice for the entering or the designation may be implemented by the panel 4. At step S22, the above-described processings at steps S3 through 9 in FIG. 11 are performed to acquire suitable chords that may follow the preceding reference chord.

At step S23, a process similar to step S22 is performed to acquire suitable chords that may precede the succeeding reference chord.

In this case, a preceding chord table is required in addition to the next chord table in FIG. 7. The preceding chord table may be prepared separately from the next chord table. Further, a preceding chord table may be prepared by invertedly referring to the next chord table and by collecting chords each of which has a higher probability that they will exist as preceding chords for the reference chord. FIG. 9 is a diagram for an example of the preceding chord table. In the preceding chord table, function chords that may precede individual function chords are arranged in the descending order of probability.

At step S24, chords are extracted that are included in both of the suitable following chords obtained at step S22 and the preceding suitable chords obtained at step S23. At step S25, the chords thus extracted are displayed. In this case, for example, the chords may be arranged in the descending order of probability as the next chord, or in the descending order of products of the probability to be the next chord and that to be the preceding chord. In FIG. 10 is shown an example of the display for the suitable inserted chords, that is, the chords suitable to be inserted between two successive two-reference chords. In this example of display, when a triad corresponds to one of the basic chord types (e.g., F and FΔ7), no triad is displayed for the other basic chord types (e.g., F7).

At step S26, when the user selects any one of the suitable inserted chords displayed, the selected chord is inserted into or merged in the reference chord progression and the processing is thereafter terminated. Through the above processing, a chord that can be inserted between any two successive reference chords in an arbitrary chord progression can be easily selected.

The present invention can be modified as follows. In the above embodiments, suitable chords are arranged to be displayed in the descending order of probability. However, a transition probability that the individual chords will follow or precede a reference chord cannot be recognized according to the above embodiments. As is shown in FIG. 13, therefore, the transition probabilities for the next suitable individual chords may be displayed in form of numerical values. In the second embodiment in which a chord is inserted into the chord progression, at least one of two kinds of probabilities, that is the first probability a particular chord follows and the second probability the particular chord precedes, may be separately displayed, or the products of the two probabilities for the preceding and succeeding chords may be displayed.

In the above-described embodiments, disclosed are examples of the acquisition of chord transition probability obtained by using the statistical method. However, the chord transition probability differs depending on the music genre, composer and/or musical style. Thus, transition probability tables for next chord may be previously prepared that differ in consonance with parameters such as the music genre, composer and musical style, and when a user selects at least one of the parameters, a particular transition probability table that matches the selection of the parameter(s) may be employed to display the next suitable chords. As a result, the chord progression in a specific musical style can be easily generated.

Although a user manually selects one of the displayed suitable chords in the above embodiments, a function for the automatic and random selection of an available chord may be additionally provided. Then, merely by the user designating a key and a first chord, the chord progression will be automatically generated. The first chord can be arbitrarily designated by the user.

Figure 14:
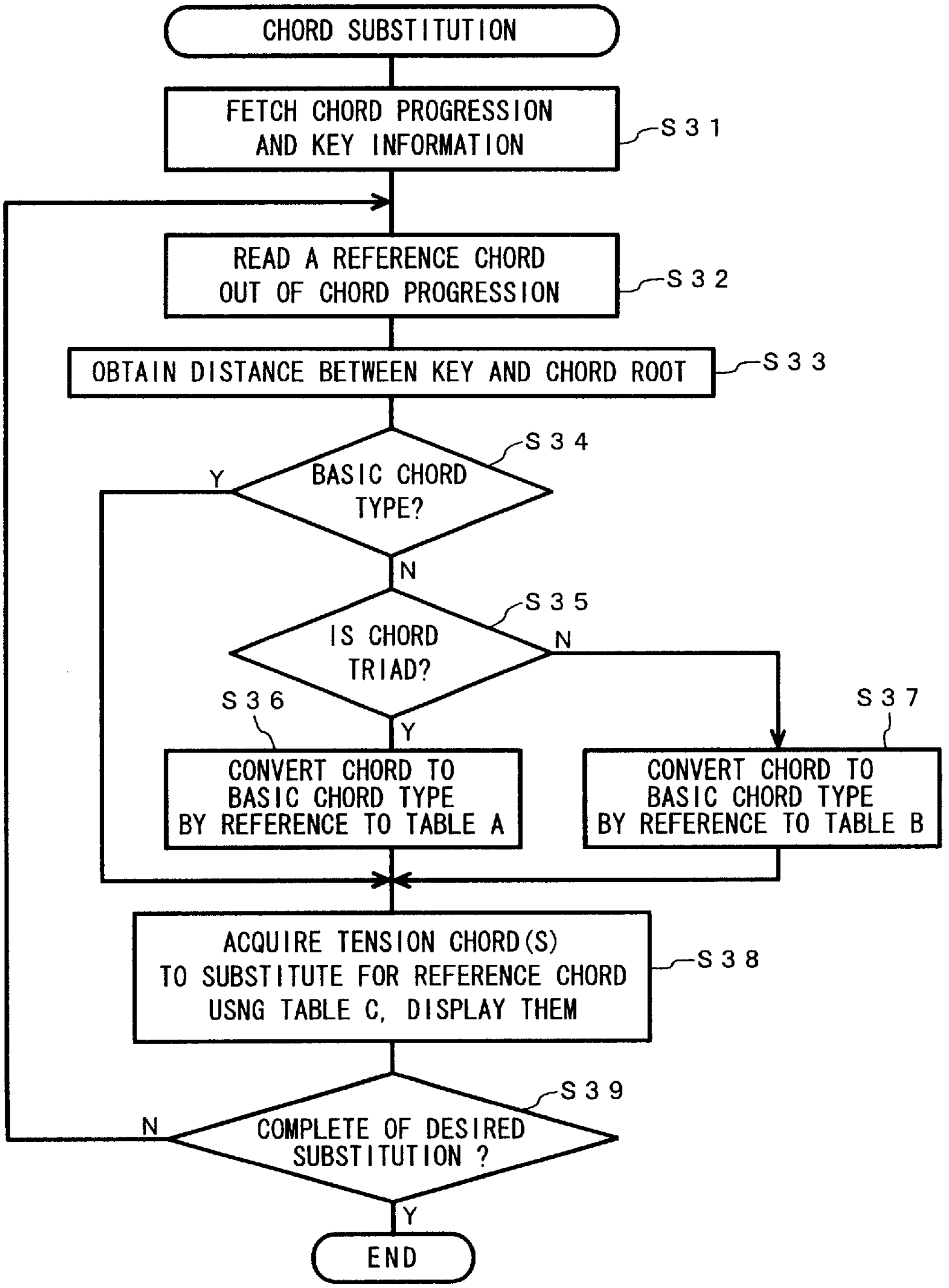
FIG. 14 is a flowchart for tension displaying process according to a third embodiment of the present invention.

FIG. 14 is a flowchart for tension substitution processing according to a third embodiment of the present invention. In the third embodiment, a chord progression stored in advance is read out, and an appropriate chord, particularly a tension chord with which a reference chord arbitrary selected out of the chord progression thus read out can be replaced, according to the musical theory, is selected and displayed. The processing in FIG. 14 is begun by a user manipulating the panel 4 to instruct the execution of the tension substitution processing. When, for example, the user selects one of the chord progressions stored in advance, at step S31, the CPU 1 fetches the selected chord progression and its key (C through B, and major/minor identification).

At step S32, one of the chords is read out of the chord progression, and at step S33 a distance (a part of a function chord) between the key and the chord root is obtained. The method for obtaining the function chord is almost the same as steps S3 and S3A in FIG. 11, and the processing at steps S34 through S37 is almost the same as steps S4 through S7.

At step S38, table C in FIG. 6 is examined to acquire a tension chord that can be employed instead of the reference chord that has been read. The original chord root is combined with the tension chord to display the combination as a chord. In table C are stored combinations of the distance symbols obtained at step S33 and the basic chord types obtained at steps S34 through S37, i.e., the tension types that can be substituted for individual function chords. The user preferably selects a tension chord out of the list displayed and stores a chord progression comprising the tension chord thus selected. At step S39, a check is performed to determine whether or not the process has been completed for all described substitution with respect of the chord progression that has been read in. If the process has not yet been completed, the program control returns to step S32 and the same process is repeated. Through the above processing, a proper tension chord can be easily selected for each chord in consonance with musical theory.

A practical example of the substitution of chord progression according to the third embodiment of the present invention will now be described. When the chord substitution processing is performed for the chord progression, C–D–Bm–E . . . with key "G", a distance symbol for a distance between the key "G" and the first chord root "C" is calculated at step S33. The numerical values for key "G" and chord root "C" are respectively "7" and "0", obtained by examining the table in FIG. 2. The difference between them is 0−7=−7, and 12 is added to −7 to obtain "5". The value "5" is converted to the distance symbol "IV" by using the table in FIG. 3

Since the chord root "C" represents a triad (major), it is converted to the basic major chord type "Δ7" by referring to the "IV" column in table A in FIG. 4. After the function chord for chord root "C" is determined to be "IVΔ7", the table C in FIG. 6 is examined and tension chords being employable, "Δ9", "$6^{(9)}$" and "$\Delta 7^{(\#11)}$" are read out. The original chord root "C" is combined with them, and the resultant "CΔ9", "$C6^{(9)}$" and "$C\Delta 7^{(\#11)}$" are displayed as available tension chords. When the user selects the tension chord "CΔ9" in the display, the tension chord selected is merged to the reference chord progression and the tension substitution processing for the next chord is performed.

The same process is hereinafter repeated, so that IVΔ7–V7 –IIIm7–VI7. . . is obtained as a function chord train corresponding to the chord progression C–D–Bm–E . . . , and another chord progression, for example, $C\Delta 9\text{–}D9^{(13)}$ $\text{–}Bm7^{(b13)}\text{–}E7^{(\#9,\ b13)}$ is obtained as the corresponding tension chord train. The electronic musical instrument may employ such chord progression to play the accompaniment by a well known automatic accompaniment function.

The third embodiment may be modified as follows. Although, in the third embodiment, a user manually selects one of the acquired and displayed tension chords, a function for an automatic and random selection out of available tension chords thus acquired and displayed may be additionally provided. In addition, another function may be provided for automatically substituting an available tension chord for a triad or a basic chord in an existing chord progression for the automatic playing thereof. As a result, the provision of the tension chord and the confirmation of a provided musical tone are performed at the same time.

When an original chord is a tension chord in a reference chord progression, the original tension chord alone may be displayed without any conversion process of the present invention, or both the tension chord in table C and the original chord may be displayed after the conversion process has been performed. Tension chords being employable may be displayed in the descending order of the frequencies in use that are summed up using the statistical method, as in the first embodiment.

As is described above, according to the present invention, a user inputs or selects a key and a chord or a chord string as reference to generate and display a list of chords that can follow the inputted or selected reference chord, and/or that can be inserted between successive two reference chords, so that the user is allowed to select a desired chord out of the list, in consonance with musical theory. In this manner, a suitable and correct chord progression can be easily generated without requiring a high level of knowledge on music.

In addition, a user inputs or selects a key and a rather simple chord such as a triad and a basic chord, to display a list of tension chords that can be substituted for the simple chord, so that the user is allowed to select an arbitrary tension chord on the basis of the display. As a result, a suitable tension chord can be easily selected in consonance with musical theory without requiring a high level of knowledge of music.

Further, according to an electronic musical instrument employing the chord progression input/modifying device of the present invention and a well known automatic accompaniment device, since automatic accompaniment is played based on the inputted or modified chord progression immediately after the chord progression input/modification has been completed, any chord progression can be easily examined to determine whether it matches the taste of a user. Furthermore, a chord progression that employs simple chords can be modified to another chord progression with the tension chords, so that the automatic accompaniment with excellent acoustics can be provided.

The present invention can be applied to electronic musical instruments, such as an electronic piano, a silent or hybrid piano comprising an acoustic piano and an electronic piano, a synthesizer, and a dedicated automatic accompaniment device, a personal computer and others.

What is claimed is:

1. A chord progression input/modification device comprising:

means for obtaining a reference function chord corresponding to a reference chord designated by a user, acquisition means for acquiring a group of suitable following function chords which can follow the reference function chord in consonance with musical theory, and means for obtaining at least one of a plurality of triads, basic chords and tension chords corresponding to each function chord in the group of suitable following function chords as a group of suitable following chords.

2. A chord progression input/modification device according to claim 1, further comprising display means for displaying the group of suitable following chords.

3. A chord progression input/modification device according to claim 1, further comprising chord progression generating means for selecting a chord out of the group of suitable following chords, merging the selected chord to follow the reference chord, and generating a newly modified chord progression.

4. A chord progression input/modification device according to claim 1, where in a function chord of a chord is a combination of a distance symbol representing an interval of a chord root of the chord with respect to a key and a basic chord from which the chord is derived.

5. A chord progression input/modification device according to claim 1, wherein the acquisition means acquires function chords with a statistical high probability of being used to follow the reference function chord in known existing chord progressions as the group of suitable following chords.

6. A chord progression input/modification device according to claim 2, wherein the display means displays the selected group of suitable following chords in descending order of a statistical probability of being used to follow the reference chord in known existing chord progressions.

7. A chord progression input/modification device according to claim 6, wherein the display means displays the selected group of suitable following chords in descending order of the probability, together with a numerical value thereof.

8. A chord progression input/modification device according to claim 1, wherein the chord progression modification device is built in an electronic musical instrument.

9. A chord progression modification device comprising:

means for obtaining a first and a second reference function chord corresponding to a first and a second successive reference chord, respectively, designated by a user, a first acquisition means for acquiring a group of suitable following function chords which can follow the first reference function chord in consonance with musical theory, a second acquisition means for acquiring a group of suitable preceding function chords which can precede the second reference function chord in consonance with musical theory, a third acquisition means for acquiring a group of suitable function chords to be inserted, which are commonly included in both of the groups of suitable following and preceding function chords, and means for obtaining at least one of a plurality of triads, basic chords and tension chords corresponding to each function chord in the group of suitable function chords to be inserted as a group of suitable chords to be inserted between the first and second successive reference chords.

10. A chord progression modification device according to claim 9, further comprising display means for displaying the group of suitable chords to be inserted between the first and second successive reference chords.

11. A chord progression modification device according to claim 9, further comprising chords progression generating means for selecting a chord out of the group of suitable chords to be inserted between the first and second successive reference chords, merging the selected chord between the first and the second reference chords, and generating a newly modified chord progression.

12. A chord progression modification device according to claim 9, wherein a function chord of a chord is a combination of a distance symbol representing an interval of a chord root of the chord with respect to a key and a basic chord from which the chord is derived.

13. A chord progression modification device according to claim 9, wherein the chord progression modification device is built in an electronic musical instrument.

14. A chord progression modification device comprising:

means for obtaining a reference function chord corresponding to a reference chord designated by a user, acquisition means for acquiring a group of suitable substitute function chords which can be used in place of the reference function chord in consonance with musical theory, and means for obtaining at least one of a plurality of triads, basic chords and tension chords corresponding to each function chord in the group of suitable substitute function chords as a group of suitable substitute chords.

15. A chord progression modification device according to claim 14, further comprising display means for displaying the group of suitable substitute chords.

16. A chord progression modification device according to claim 14, further comprising chords progression generating means for selecting a chord out of the group of suitable substitute chords, replacing the reference chord with the selected chord, and generating a newly modified chord progression.

17. A chord progression modification device according to claim 14, wherein a function chord of a chord is a combination of a distance symbol representing an interval of a chord root of the chord with respect to a key and a basic chord from which the chord is derived.

18. A chord progression modification device according to claim 14, wherein the chord progression modification device is built in an electronic musical instrument.

19. A method for modifying or inputting a chord progression, the method comprising the steps of:

obtaining a reference function chord corresponding to a reference chord designated by a user, acquiring a group of suitable following function chords which can follow the reference function chord in consonance with musical theory, and obtaining at least one of a plurality of triads, basic chords and tension chords corresponding to each function chord in the group of suitable following function chords as a group of suitable following chords.

* * * * *

UNITED STATES PATENT AND TRADEMARK OFFICE

CERTIFICATE OF CORRECTION

PATENT NO. : 5,852,252
DATED : December 22, 1998
INVENTOR(S) : Junichi Takano

It is certified that error appears in the above-identified patent and that said Letters Patent is hereby corrected as shown below:

Column 3, line 51, change "a MIDI" to -- an MIDI --.
Column 5, line 8, after "S7" change "has" to -- have --.
Column 5, line 19, change "progression" to -- progressions --.
Column 5, line 44, before "shows" delete "are.
Column 6, line 36, replace "While the" with -- The --.
Column 7, line 19, change "two-reference" to -- reference -- .
Column 7, line 39, after "displayed in" insert -- the --.
Column 9, line 29, before "music" change "on" to -- of --.

Signed and Sealed this

Tenth Day of April, 2001

Attest:

Nicholas P. Godici

NICHOLAS P. GODICI

*Attesting Officer* *Acting Director of the United States Patent and Trademark Office*